United States Patent
Webber et al.

(10) Patent No.: US 9,914,136 B2
(45) Date of Patent: Mar. 13, 2018

(54) PROCESS FOR REDUCING SOLUBLE ORGANIC CONTENT IN PRODUCED WATERS ASSOCIATED WITH THE RECOVERY OF OIL AND GAS

(71) Applicants: AQUERO COMPANY, LLC, Eugene, OR (US); 1257 122 ALBERTA LTD., Calgary (CA)

(72) Inventors: Timothy J. Webber, Calgary (CA); T. Daniel Sikes, Eugene, OR (US); C. Steven Sikes, Eugene, OR (US)

(73) Assignees: Aquero Company, LLC, Eugene, OR (US); 1257 122 Alberta Ltd., Calgary (CA)

(*) Notice: Subject to any disclaimer, the term of this patent is extended or adjusted under 35 U.S.C. 154(b) by 513 days.

(21) Appl. No.: 14/416,772

(22) PCT Filed: Jul. 22, 2013

(86) PCT No.: PCT/US2013/051507
§ 371 (c)(1),
(2) Date: Jan. 23, 2015

(87) PCT Pub. No.: WO2014/018452
PCT Pub. Date: Jan. 30, 2014

(65) Prior Publication Data
US 2015/0259231 A1    Sep. 17, 2015

Related U.S. Application Data

(60) Provisional application No. 61/674,926, filed on Jul. 24, 2012.

(51) Int. Cl.
*B01D 17/04* (2006.01)
*B01D 21/01* (2006.01)
(Continued)

(52) U.S. Cl.
CPC ......... *B03D 1/1443* (2013.01); *B01D 17/047* (2013.01); *B01D 21/01* (2013.01);
(Continued)

(58) Field of Classification Search
None
See application file for complete search history.

(56) References Cited

U.S. PATENT DOCUMENTS 3,502,575 A    3/1970  Hepp
3,541,009 A   11/1970  Arendt
(Continued)

FOREIGN PATENT DOCUMENTS

CA    2204087     11/1997
JP    2001129310   5/2001
(Continued)

OTHER PUBLICATIONS

PCT International Search Report from the Corresponding PCT Application No. PCT/US2013/051507, dated Dec. 16, 2013 (2 sheets).
(Continued)

*Primary Examiner* — Clare M Perrin
(74) *Attorney, Agent, or Firm* — MBM Intellectual Property Law LLP

(57) ABSTRACT

A chemical treatment process and separation module are described for removal of soluble organic compounds and suspended or emulsified oils and/or solids from produced waters that accompany operations for oil and gas recovery. The process occurs in its entirety within an interval of several minutes. The solubility of organic compounds is first reduced, in an optional step, by pH reduction, followed by treatment with coagulants and flocculants, the latter in conjunction with microbubble flotation. The organic compounds that are rendered insoluble, along with other oily (Continued)

solids, are captured in the floe created by the coagulant and flocculant treatment, and simultaneously made buoyant by the concurrent addition of microbubbles. The water and floe is passed over an array of sloped strainers that separates and diverts the floe from the effluent water, which contains significantly reduced soluble organic content. The separated stream of oily solids can be dewatered for disposal as waste.

27 Claims, 3 Drawing Sheets

(51) Int. Cl.

| | | |
|---|---|---|
| B03D 3/00 | (2006.01) | |
| C02F 1/52 | (2006.01) | |
| C02F 1/24 | (2006.01) | |
| B03D 1/00 | (2006.01) | |
| B01D 29/00 | (2006.01) | |
| B03D 1/14 | (2006.01) | |
| B01D 21/02 | (2006.01) | |
| B03D 1/016 | (2006.01) | |
| B03D 3/02 | (2006.01) | |
| B03D 3/06 | (2006.01) | |
| C02F 1/66 | (2006.01) | |
| C02F 1/56 | (2006.01) | |
| C02F 9/00 | (2006.01) | |
| C02F 1/00 | (2006.01) | |
| B01D 35/00 | (2006.01) | |
| B01D 37/00 | (2006.01) | |
| C02F 1/40 | (2006.01) | |
| B01D 21/00 | (2006.01) | |
| C02F 101/32 | (2006.01) | |
| C02F 103/10 | (2006.01) | |
| C02F 103/36 | (2006.01) | |

(52) U.S. Cl.
CPC .......... *B01D 21/02* (2013.01); *B01D 25/04* (2013.01); *B01D 29/0018* (2013.01); *B03D 1/016* (2013.01); *B03D 3/02* (2013.01); *B03D 3/06* (2013.01); *C02F 1/24* (2013.01); *C02F 1/5281* (2013.01); *C02F 1/56* (2013.01); *C02F 1/66* (2013.01); *C02F 9/00* (2013.01); *C02F 2101/325* (2013.01); *C02F 2103/10* (2013.01); *C02F 2103/365* (2013.01); *C02F 2201/003* (2013.01)

(56) References Cited

U.S. PATENT DOCUMENTS

| | | | |
|---|---|---|---|
| 3,633,310 A | 1/1972 | Sandiford | |
| 3,705,467 A | 12/1972 | McKnight | |
| 3,775,311 A * | 11/1973 | Mook et al. ............ | B03D 1/16 209/164 |
| 3,873,487 A | 3/1975 | Minato et al. | |
| 3,875,054 A | 4/1975 | Hunt et al. | |
| 3,932,282 A | 1/1976 | Ettelt | |
| 3,981,100 A | 9/1976 | Weaver et al. | |
| 4,066,495 A | 1/1978 | Voigt et al. | |
| 4,071,447 A | 1/1978 | Ramirez | |
| 4,105,824 A | 8/1978 | Monte | |
| 4,120,815 A | 10/1978 | Raman | |
| 4,175,035 A * | 11/1979 | Moyer, Jr. ............ | B03B 9/005 209/10 |
| 4,214,987 A | 7/1980 | Clemens | |
| 4,237,004 A * | 12/1980 | Helke .................... | C02F 1/283 210/221.2 |
| 4,244,813 A * | 1/1981 | Moyer, Jr. ............ | B03B 9/005 209/10 |
| 4,330,407 A | 5/1982 | Shermer et al. | |
| 4,330,409 A | 5/1982 | Yong et al. | |
| 4,382,853 A | 5/1983 | McCoy | |
| 4,405,015 A | 9/1983 | McCoy et al. | |
| 4,457,371 A | 7/1984 | McCoy et al. | |
| 4,600,501 A | 7/1986 | Poirier | |
| 4,673,511 A | 6/1987 | Richardson et al. | |
| 4,699,951 A | 10/1987 | Allenson et al. | |
| 4,705,825 A | 11/1987 | Symes et al. | |
| 4,734,205 A | 3/1988 | Jacques et al. | |
| 4,738,784 A | 4/1988 | Sugihara | |
| 4,741,835 A | 5/1988 | Jacques et al. | |
| 4,797,145 A | 1/1989 | Wallace | |
| 5,128,046 A | 7/1992 | Marble et al. | |
| 5,178,774 A | 1/1993 | Payne et al. | |
| 5,330,656 A | 7/1994 | Hassick | |
| 5,408,029 A | 4/1995 | Wood | |
| 5,451,328 A | 9/1995 | Bottero et al. | |
| 5,593,947 A | 1/1997 | Kinnersley et al. | |
| 5,659,998 A | 8/1997 | Salestrom | |
| 5,693,222 A | 12/1997 | Galvan et al. | |
| 5,730,882 A | 3/1998 | Gallup et al. | |
| 5,861,356 A | 1/1999 | Koskan et al. | |
| 5,928,474 A | 7/1999 | Moffett | |
| 6,034,204 A | 3/2000 | Mohr et al. | |
| 6,042,732 A | 3/2000 | Jankowski et al. | |
| 6,048,438 A | 4/2000 | Rosencrance et al. | |
| 6,214,786 B1 | 4/2001 | Randall et al. | |
| 6,217,778 B1 | 4/2001 | Shing et al. | |
| 6,238,521 B1 | 5/2001 | Shing et al. | |
| 6,307,013 B1 | 10/2001 | Chivers | |
| 6,337,023 B1 | 1/2002 | Broussard, Sr. | |
| 6,620,317 B2 * | 9/2003 | Alviti .................... | C02F 1/52 210/205 |
| 6,699,363 B2 | 3/2004 | Moffett | |
| 6,803,107 B2 | 10/2004 | Mitchell et al. | |
| 6,825,313 B2 | 11/2004 | Sikes | |
| 6,884,347 B1 | 4/2005 | Krieger | |
| 6,889,471 B2 | 5/2005 | Arnold | |
| 6,960,294 B2 | 11/2005 | Arnaud | |
| 6,969,750 B2 | 11/2005 | Tanaka et al. | |
| 7,077,201 B2 | 7/2006 | Heins | |
| 7,160,470 B2 | 1/2007 | Davis et al. | |
| 7,183,336 B2 | 2/2007 | Berlin et al. | |
| 7,497,954 B2 | 3/2009 | Ivan et al. | |
| 7,595,002 B2 | 9/2009 | Sikes et al. | |
| 7,595,007 B2 | 9/2009 | Sikes et al. | |
| 7,981,297 B2 | 7/2011 | Sauvignet et al. | |
| 7,987,297 B2 | 7/2011 | Schwabe et al. | |
| 9,321,663 B2 | 4/2016 | Sikes et al. | |
| 2002/0058786 A1 | 5/2002 | Chivers | |
| 2002/0121484 A1 | 9/2002 | Arai | |
| 2004/0006198 A1 | 1/2004 | Sikes | |
| 2004/0007500 A1 | 1/2004 | Kresnyak | |
| 2005/0194323 A1 | 9/2005 | Ruth et al. | |
| 2008/0058576 A1 | 3/2008 | Shafer | |
| 2009/0127205 A1 | 5/2009 | Sikes | |
| 2010/0038314 A1 | 2/2010 | Vion | |
| 2010/0126926 A1 * | 5/2010 | Wiemers ............ | B01D 61/022 210/294 |
| 2010/0213405 A1 | 8/2010 | Wensloff | |
| 2011/0195844 A1 | 8/2011 | Bruchmann | |
| 2011/0272362 A1 * | 11/2011 | Sikes .................... | C02F 1/56 210/705 |
| 2011/0272363 A1 | 11/2011 | Grazziotin | |
| 2012/0282678 A1 * | 11/2012 | Champagne ........... | A01K 63/04 435/257.1 |
| 2014/0166586 A1 | 6/2014 | Sikes | |
| 2015/0259231 A1 | 9/2015 | Webber et al. | |

FOREIGN PATENT DOCUMENTS

| | | |
|---|---|---|
| JP | 2007-209890 | 8/2007 |
| WO | 9821271 | 5/1998 |
| WO | 2005054300 | 6/2005 |
| WO | 2007047481 | 4/2007 |
| WO | 2010011867 | 1/2010 |
| WO | 2012148397 | 1/2012 |
| WO | 2014018452 | 1/2014 |

(56) References Cited

FOREIGN PATENT DOCUMENTS

OTHER PUBLICATIONS

American Society for Testing and Materials, Method D 7066-04, 2004.
United States Environmental Protection Agency (EPA) Method 1664, Revision A, 1999. N-Hexane extractable material (HEM; oil and grease) and silica gel treated n-hexane extractable material (SGT-HEM; non-polar material) by extraction and gravimetry. Cincinnati, Ohio: U.S. EPA National Service Center for Environmental Publications, Doc. No. EPA-821-R-98-002, Feb. 1999, 23 pages.
United States Environmental Protection Agency (EPA) Method 9071A, Revision 1, 1994, Oil and grease extraction method for sludge and sediment samples. U.S. EPA, Sep. 1994, 1-7.
Hans Burkert, Jürgen Hartmann: "Flocculants" In: Ullmann's Encyclopedia of Industrial Chemistry (Jun. 2005), pp. 1-6.
Orts et al., "Biopolymer additives to reduce erosion-induced soil losses during irrigation" Industrial Cops and Products 11 (2000) 19-29.
Orts et al., ACS Symposium Series (2001), 786 (Biopolymers form Polysaccharides and Agroproteins), 102-116.
Lentz et al., Soil Science Society of America Journal, 56(6):P1926-1932 (1992).
Hart, "Chemical Removal of Organic Foulants form Produced Water Recycled as Steam" SPE International Thermal Operations and Heavy Oil Symposium and International Horizonal Well Technology Conference (2002).
Wang et al., "Effects of Chemical Application on Antifouling in Steam—Assisted Gravity Drainage Operations" Energy & Fuels, vol. 19, pp. 1425-1429 (2005).
International Search Report dated Nov. 30, 2009 and Written Opinion dated Jan. 28, 2010 (WO 2010/011867).
International Preliminary Report on Patentability dated Jan. 23, 2011 (WO 2010/011867).
International Search Report dated Mar. 26, 2012 and Written Opinion dated Nov. 1, 2012 (WO 2012/148397).
International Search Report, Written Opinion and IPRP dated Dec. 16, 2013 (WO 2014/018452).
Office Action dated Jul. 13, 2015 (CA 2,731,608).
Office Action dated Jan. 28, 2015 (AU 2009273946).
Office Action dated Jun. 14, 2012 (EP 09790780.2).
Office Action dated Aug. 18, 2014 (EP 09790780.2).
Office Action dated Apr. 14, 2008 (CA 2,595,723).
Office Action dated Jun. 18, 2010 (CA 2,643,137).
Office Action dated Apr. 1, 2011 (CA 2,643,137).
Office Action dated Feb. 28, 2012 (CA 2,643,137).
Office Action dated Jun. 26, 2009 (EP 06825932.4).
Office Action dated Jul. 12, 2010 (EP 06825932.4).
Office Action dated Nov. 10, 2011 (EP 06825932.4).
Office Action dated Feb. 6, 2014 (EP 06825932.4).
Office Action dated Nov. 28, 2012 (EP 11172873.9).
Office Action dated Jul. 9, 2015 (EP 11172873.9).
Restriction Requirement dated Oct. 23, 2008 (U.S. Pat. No. 7,595,007).
Office Action dated Jan. 9, 2009 (U.S. Pat. No. 7,595,007).
Office Action dated Nov. 14, 2008 (U.S. Pat. No. 7,595,002).
Office Action dated Aug. 17, 2016 (US2014/0166586).
Office Action dated Mar. 11, 2011 and Office Action dated May 17, 2011 (US 2009/0127205).
Office Action dated Nov. 17, 2011 (US 2009/0127205).
Office Action dated May 21, 2012 (US 2009/0127205).
Office Action dated Aug. 29, 2012 (US 2009/0127205).
Office Action dated Mar. 24, 2014 (US 2009/0127205).
Office Action dated Jan. 8, 2015 (US 2009/0127205).
Notice of Allowance dated Jun. 2, 2009 (U.S. Pat. No. 7,595,007).
Notice of Allowance dated Jun. 1, 2009 (U.S. Pat. No. 7,595,002).
Office Action dated Mar. 18, 2015 (U.S. Appl. No. 13/055,432).
Office Action dated Apr. 26, 2016 (CA 2,731,608).
Office Action dated Mar. 1, 2016 (EP 06825932.4).
Office Action dated Mar. 4, 2016 (US 2009/0127205).
Office Action dated Oct. 11, 2016 (US2009/0127205).
Notice of Allowance dated Dec. 24, 2015 (U.S. Appl. No. 13/055,432).
Notice of Allowance dated Jul. 12, 2016 (CA 2,731,608).
Decision to Grant dated Mar. 1, 2016 (11172873.9).
Office Action dated Jun. 5, 2017 (US2009/0127205).
Office Action dated Mar. 1, 2017 (2,834,496).
Notice of Allowance dated May 12, 2017 (US2014/0166586).

\* cited by examiner

PROCESS FOR REDUCING SOLUBLE ORGANIC CONTENT IN PRODUCED WATERS ASSOCIATED WITH THE RECOVERY OF OIL AND GAS

FIELD OF THE INVENTION

The invention is concerned with joint chemical and physical processes for removal of soluble, emulsified, and insoluble organic compounds from process waters and produced waters that accompany operations for recovery of oil and gas. In particular, a system employing a nested series of containers and an array of sloped strainers is used to separate flocculated materials from chemically flocculated process waters.

BACKGROUND

A principal thermal method of oil recovery from oil sands formations, for example, is steam-assisted gravity drainage (SAGD). In oil recovery via SAGD, steam at approximately 290° C. and suitable pressure (ranging for example from 70 to 150 bars) is injected from an injection well into the formation at depth to heat and liquefy the bitumen so that it flows downward into a recovery well situated several meters below the points of injection. The fluidized bitumen is brought to the surface along with injected steam/water at approximately 180-210° C. and 10 to 20 bars at the well head. Typical water/oil ratios at the well head range between approximately 2.0 to 4.0.

Oil is separated from the aqueous phase so that the oil product can be sent to the pipeline for downstream processing. The aqueous stream after the primary separation steps during oil/gas recovery operations is termed produced water. It typically contains some or all of the following: residual oily product, emulsified oily micelles, low levels of dissolved organic compounds, and dissolved inorganic salts along with microparticulates of sand and clay. The produced water is treated to remove oily residuals along with dissolved salts and the other substances before it can be recycled to the steam generators for re-injection.

Recycling of produced waters as herein exemplified in thermal heavy oil currently relies on separation of oily phases from a clarified aqueous phase. Separation processes typically include the use of flocculants, coagulants, microbubble flotation, inclined plate (lamella) separation, coalescing plate media, media bed filtration, organic membrane separation (reverse osmosis) and centrifugal separation arranged in various complete or partial combinations thereof.

None of these processes specifically include methods or techniques to insolubilize organic compounds that otherwise are dissolved in the produced water. Rather, current processes effect separation of only a fraction of soluble organic content through adsorption to and subsequent buoyancy of physically discrete and insoluble components of the produced water. These include free oil droplets, emulsified water-in-oil droplets, complex emulsion droplets, oil-wet solids of neutral-to-positive buoyancy, and high-specific-gravity (>1.0) oil wet solids comprised largely of microparticulates of mineral solids (such as sand and clay) that have been rendered positively buoyant through microbubble attachment. The existing philosophy of process design for produced water de-oiling in thermal heavy-oil operations and facilities relies on this buoyancy effect.

In practice, current process design for produced water de-oiling in thermal heavy oil recovery also results in removal of soluble organic compounds via physical adsorption onto and precipitation with potential sealants such as mineral silicates, carbonates, and phosphates that are removed during treatment steps that employ hydrated lime/magnesium oxide/sodium carbonate slurry contactors ("lime softeners" or "lime slurry softening reactors").

However, such process elements are not included in some new construction designs that are built around falling film evaporation methods for provision of high quality boiler-water feed. Thus, the novel deoiling strategy being presented may also be further needed and particularly useful in such new construction.

There are no dimensioning criteria for practical deoiling methodology at laboratory scale beyond extraction of soluble organic compounds onto silica gel. However, silica gel treatment to remove soluble organic compounds from produced water has not been implemented, not only because the cost is too high for the results that can be achieved, but also in view of problems with handling and disposal of large waste amounts of oily silica gel.

The solubility of organic compounds in SAGD produced waters is generally at a maximal state at reservoir temperature (generally over 180° C. in thermal heavy oil recovery). As this water is brought to surface in the production process, it is typically cooled and de-pressured for storage in atmospheric tanks at temperatures of 80 to 90° C. and at atmospheric pressure. Under these circumstances, the solubility of both the organic compounds and some inorganic components like sulfides and silicates is reduced, and they approach some degree of super-saturation. This is commonly seen as a yellow to dark brown or black color in the waters.

The soluble and emulsified organic compounds in thermal heavy oil recovery operations are generally perceived to be predominately comprised of organic acids, which are negatively charged at near neutral pH. The stable reverse emulsion of oil-in-water that characterizes oil/gas produced water is thus considered to be anionically dispersed, or stabilized.

The ionic and polar character of these compounds, and their relatively high concentrations (on the order of 1000 ppm), interfere with the chemical and physical reactions commonly employed to prepare de-oiled produced water for reuse as boiler feed water. The process steps that are negatively influenced by the soluble organic compounds include precipitation softening, physical adsorption, ion exchange softening and media bed filtration.

The interference effects are not well-documented, due to the large variety of soluble organic chemicals involved; however, the chemical reactions of precipitation softening, physical adsorption, ion exchange softening and media bed filtration are known to work more efficiently and controllably in waters that contain no soluble organic compounds.

SUMMARY OF THE INVENTION

In one aspect, the invention provides a method of clarifying waste process water containing soluble organic compounds and suspended and/or emulsified oils and/or solids, the method comprising:
  (a) adding a polycationic coagulant to the process water;
  (b) following step (a), subjecting the water stream to an aging step 5 seconds to 10 minutes in length in which the water stream undergoes reduced turbulence;
  (c) following said aging step and addition of coagulant, adding a flocculant, comprising an acrylamide copolymer having a molecular weight of at least 4 million Daltons, to the process water, and simultaneously introducing gaseous microbubbles into the process water, whereby, during subsequent formation and agglomeration of flocs of solid and semisolid matter, the microbubbles become entrained within and adhere to the flocs;

(d) introducing the flocculant-treated water and flocs into a separation module, the separation module comprising three containment systems, designated (i) an inner tank, having an inlet and defining an inner chamber, (ii) a central tank, having at least one outlet, surrounding said inner tank and defining an annular central chamber, and (ii) one or more outer tanks exterior to said central tank, each having at least one outlet, and defining an outer chamber or chambers, wherein the upper perimeter of the inner tank has attached thereto one or more porous or perforated screen assemblies which extend over the central chamber at a downward angle, to reach the outer chamber or chambers, and cover at least a portion of the central chamber, such that said flocculant-treated water flows through said inlet, upward through said central chamber, over and though said screens, and into the central chamber, and said flocs flow over said screens and into said outer chamber or chambers.

In one embodiment, the pH of the process water is adjusted just prior to, along with, or just after the addition of the coagulant to a range of about 2 to 4, or about 3 to 4, or about 3.5 to 4.

The method may employ an additional aging step following the pH adjustment, or it may a single aging step, following the addition of polycationic coagulant. Each said aging step is preferably about 5 seconds to 5 minutes in length, and may be about 15 to 60 seconds in length.

The reduced turbulence during said aging step(s) may be facilitated by the use of an increased diameter pipe, e.g. 8 or more inches in diameter, or 12 or more inches in diameter, for throughput during said aging step(s). The length of the pipe having this increased diameter pipe may be 5, 10, or 20 meters or more. Typically, the flow rate during the aging step(s) is about 300 gallons/minute or less, in some cases 100 gal/min or less.

Other means of slowing the velocity and reducing the turbulence of the waste stream during treatment are contemplated. For example, higher volume tanks may be placed in the process line as needed to provide a residence time and relative quiescence for the aging step or steps.

In selected embodiments, the outer chamber of said separation module is a single chamber surrounding the central chamber, such that flocs flowing over said screens flow into said outer chamber. In another embodiment, the separation module comprises a plurality of outer tanks surrounding said central tank, at locations corresponding to said screens, such that flocs flowing over said screens flow into said outer tanks.

Preferably, any portions of the upper perimeter of the inner tank to which screens are not attached are of increased height, to direct flow of water out of the inner tank and onto the screens. In selected embodiments, screens are attached to the entire perimeter of the upper edge of the inner tank.

In some embodiments, the waste process water to be treated is downstream waste water (produced water) from an oil-sands, oil-recovery operation, e.g. a steam-assisted, gravity drainage (SAGD) operation, comprising a hydrocarbon- and bitumen-containing oil-in-water emulsion with suspended microparticulate mineral materials. The treated water can then be recycled to the steam generators.

In another embodiment, the waste process water may be injected into a disposal well after treatment.

The coagulant used for treatment may be an epichlorohydrin-dimethylamine copolymer (polyEPI/DMA) or a polymer of diallyl dimethyl ammonium chloride (polyDADMAC) and has a molecular weight less than 1 million Daltons. Alternatively, the coagulant may be a polyaluminate.

In selected embodiments, the acrylamide polymer used for flocculation is selected from an acrylamide/acrylate copolymer, an acrylamide/allyl trialkyl ammonium copolymer, and an acrylamide/diallyl dialkyl ammonium copolymer. The flocculant composition may further comprise a heat-activated or pregelatinized starch having flocculating activity. Coagulant and flocculant compositions are further described, for example, in U.S. Patent Appn. Pubn. Nos. 2009/0127205 and 2011/0272362, which are incorporated herein by reference for all purposes.

In a related aspect, the invention provides a separation module for separation of flocculated materials from water, comprising three containment systems, designated (i) an inner tank, having an inlet and defining an inner chamber, (ii) a central tank, having at least one outlet, surrounding said inner tank and defining an annular central chamber, and (ii) one or more outer tanks exterior to said central tank, each having at least one outlet, and defining an outer chamber or chambers, wherein the upper perimeter of the inner tank has attached thereto one or more porous or perforated screens which extend over the central chamber at a downward angle, to reach the outer chamber or chambers, and cover at least a portion of the central chamber, such that water containing flocculated material introduced into said inlet is able to flow upward through said central chamber, over and though said screens, and into the central chamber as clarified water, while said flocculated material flows over said screens and into said outer chamber or chambers.

Preferably, any portions of the upper perimeter of the inner tank to which screens are not attached are of increased height, to direct flow of water out of the inner tank to the screens. Screens may also be attached to the entire perimeter of the upper edge of the inner tank.

The outer chamber may be a single chamber surrounding the central chamber, such that material flowing over said screens flows into said outer chamber. Alternatively, the module may comprise a plurality of outer tanks surrounding said central tank, at locations corresponding to said screens, such that material flowing over said screens flows into said outer tanks.

DETAILED DESCRIPTION OF THE INVENTION

Figure 1:
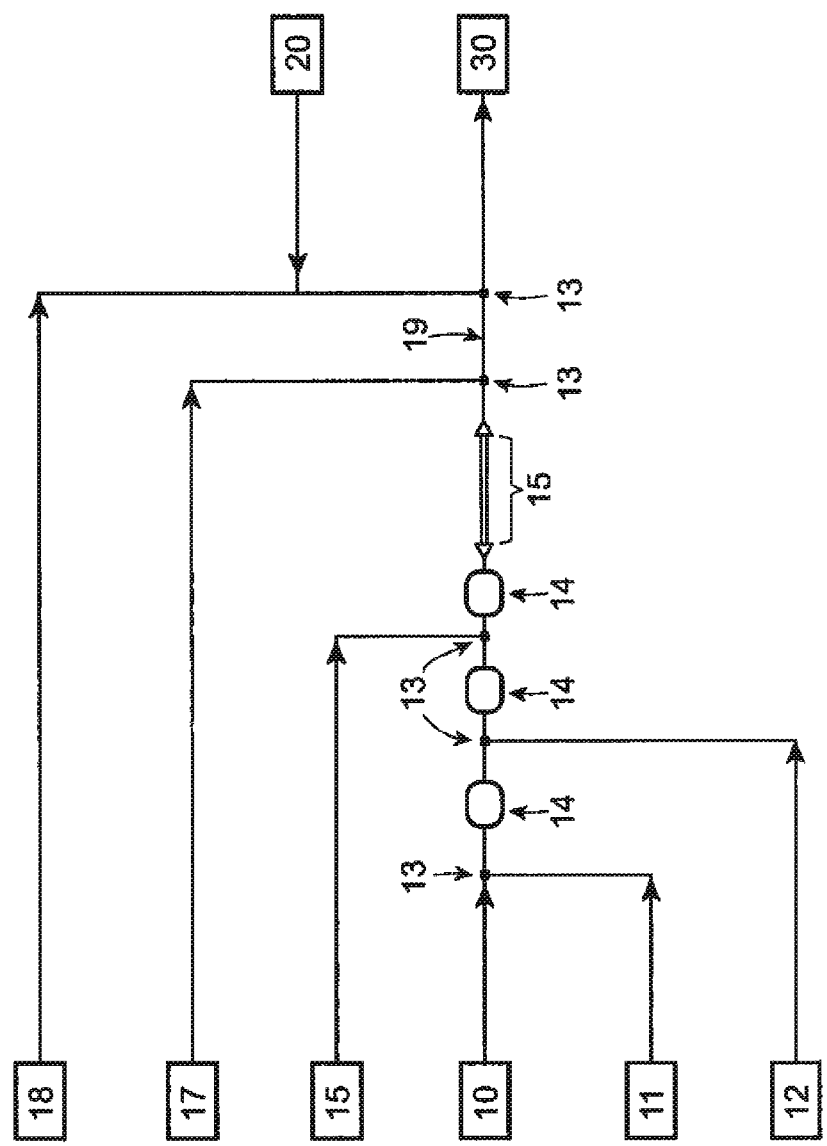
FIG. 1 is a flow chart illustrating one embodiment of a clarification process using the chemical treatment sequence disclosed herein.

A joint chemical and physical process that can be carried out in its entirety over an interval of several minutes, e.g. about 2 to 10 minutes, is described. Oily residuals and in particular the soluble organic compounds that are dissolved in produced waters during the oil/gas recovery processes are removed via the process, which is described briefly as follows.

The solubility of organic compounds in the produced waters may first be reduced by deliberate and controlled pH reduction of said waters. This step is followed by (or in some cases concomitant with or immediately preceded by) chemical treatment with coagulants, which is then followed by chemical treatment with flocculants in conjunction with microbubble flotation in a separation tank.

Such coagulation with or without pH adjustment is effective to de-emulsify oily droplets from the process water. Following one or more aging steps, as described further below, the flocculant then flocculates the de-emulsified oily droplets and bituminous particulates and brings them out of solution or emulsion. The organic compounds that are rendered insoluble, along with other oily solids, are physically captured in the floc created by the coagulant and flocculant treatment, and simultaneously made buoyant by the concurrent addition of microbubbles.

The water and floc is then passed over an array of strainers with regulated slopes that separate and divert the floc, but allow the effluent water to flow through the strainer. The effluent water has a significantly reduced soluble organic content. The pH of the effluent water may then be subject to a deliberate and controlled upward pH re-adjustment to suit downstream containment and processing for re-use in thermal heavy oil production, typically as boiler feed water in SAGD (steam assisted gravity drainage). The separated, concentrated stream of oily solids can be dewatered for subsequent treatment or storage as waste.

The subject process is also applicable for disposal water, utility water, and well work-over water. In summary, the proposed recovery process is applicable to all process waters and produced waters that accompany oil/gas recovery operations. Such waters typically contain soluble organic compounds that may be or have been shown to be detrimental to downstream processes or waste disposal processes.

The proposed recovery process may work with both new construction and retrofit of produced water de-oiling systems that are associated with recovery of oil and gas. Produced water schemes in thermal heavy oil recovery are exemplified herein; however, the recovery process is applicable to all oily produced waters, including, for example, produced waters associated with recovery of natural gas, water-flood and polymer-flood applications, flowback water from hydraulic fracturing operations, disposal of waste fluids via deep well injection, and others.

In thermal heavy oil production, the produced water is typically first cooled and processed at temperature of 130° C. or more in pressure vessels, such as free-water-knock-out vessels and treater vessels. The water is then sent through heat exchangers to bring the temperature down and lower the pressure to atmospheric. The water then flows through a primary separation tank (sometimes referred to as a skim tank or surge tank) from which it issues at approximately 80-100° C. at approximately pH 7 to pH 8.5 and containing on the order of 200-2000 ppm combined free oil, oily solids, and soluble organic compounds.

The disclosed clarification process is described in further detail as follows.

(1) Lowering the pH of the Produced Water

Figure 2:
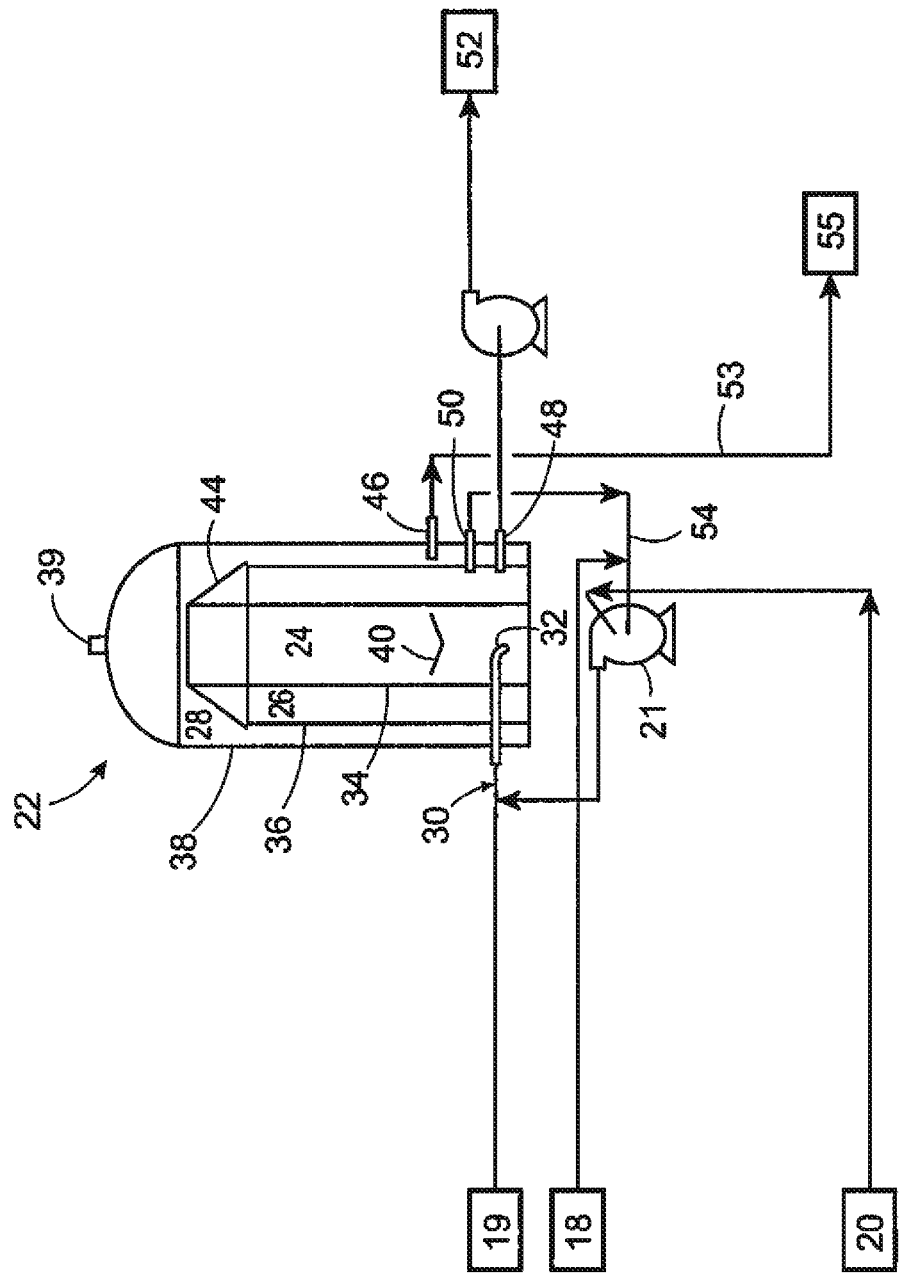
FIG. 2 is a flow chart illustrating one embodiment of a clarification process using the chemical treatments and separation module disclosed herein.

FIGS. 1 and 2 schematically illustrate embodiments of the process described in the application. As shown in FIG. 1, the produced water 10, which typically contains about 1000 ppm total organic carbon (TOC) at this stage, is throttled at a controlled rate, typically about 100 gal/min (approx. 380 L/min) and is, in some embodiments, adjusted by the addition and mixing of mineral acid, indicated at 11 and (optionally) 12, to achieve a pH of about 3 to 4, preferably about 3.5 to 4.0. Mixing tees 13 are provided at intersections, followed by static mixers 14. In one embodiment, the mineral acid can be sulfuric acid (e.g. 93 wt % $H_2SO_4$), or, more preferably, hydrochloric acid (e.g. 32 wt % HCl). The acid may be added in two stages, as illustrated. This procedure neutralizes the negative charge of the soluble and emulsified organic compounds, thus destabilizing the emulsion and minimizing the solubility and dispersibility of the organic phases.

The water so treated is allowed to age for a period of a few seconds, e.g. about 5-30 seconds, to a few minutes, e.g. 2-10 minutes or 3-5 minutes, in an environment of substantially low turbulence, such as described below. The duration is more typically approximately 30 seconds to about 5 minutes. In the event a coagulant is added (typically following the pH adjustment step), this low-turbulence aging step may be delayed until after the coagulant is added.

In some embodiments, in which the waste stream is already at low pH, and where treatment and subsequent disposition of low pH water is acceptable, the pH adjustment step may be omitted. In these cases, addition of a coagulant takes place as described below.

(2) Addition of Coagulant

A dose of a coagulant 15 may be optionally added to further neutralize and destabilize the emulsion, followed by an aging period (indicated at 16) of a few seconds, e.g. about 5-30 seconds, to a few minutes, e.g. 2-10 minutes or 3-5 minutes, in an environment of substantially low turbulence. The duration is more typically approximately 30 seconds to about 5 minutes. For example, in one embodiment, a flow rate of 100 US gallons (approx. 378 L) per minute or less and an aging time of up to five minutes are desired. To achieve the desired result, a section of increased diameter pipe may be incorporated into the process at this point. For example, approximately 20 meters of linear pipe period (indicated at 16) with a 12 inch (approx. 0.3 m) or more preferably 16 inch (approx. 0.41 m) diameter can be used. (Pipe diameters of approx. 4 inches (approx. 0.1 m) are typical for the remainder of the described process.) For lesser aging times, the length of pipe may be adjusted proportionally downward, but it is preferably 5 or 10 meters or more. Alternatively, one or more higher volume tanks may be placed in the process line as needed to provide a residence time and relative quiescence for the aging step or steps. The flow during the aging phase in this embodiment would generally have a Reynolds number greater than 2300. Truly laminar flow is not likely to be achieved in the aging step; however, the flow would have a low linear velocity, allowing for the required aging to occur.

The emulsified oily micelles and droplets coagulate during the aging step(s), as the coagulant masks the anionically dispersed oily droplets of the reverse emulsion. The pH adjustment, coagulation and aging steps guard against possible re-emulsification and dispersion that can occur as a result of downstream turbulence.

Polycationic coagulants that may be used at this stage include copolymerized epichlorohydrin and dimethyl amine (poly EPI/DMA) and polymers of cationic monomers such as ammonium alkyl acrylamides (e.g. quaternized dimethylaminopropyl acrylamide), ammonium alkyl methacrylamides (e.g. 3-methacrylamidopropyl trimethylammonium chloride), ammonium alkyl acrylates (e.g. 2-acrylatoethyl trimethylammonium chloride), ammonium alkyl methacrylates (e.g. quaternized dimethylaminoethyl methacrylate), diallyl dialkylammonium salts (e.g. diallyl dimethyl ammonium chloride), allyl trialkyl ammonium salts, and amino acids such as lysine or ornithine. The cationic monomer is present at least at 50 mole %, preferably at least 70%, and more preferably at least 80 mole %. In one embodiment, the polymer is a homopolymer. Other monomers, if present, are neutral monomers such as acrylamide or methyl (meth)acrylate. Examples are homopolymers of diallyl dialkylammonium salts or allyl trialkyl ammonium salts.

Polyepichlorohydrin/dimethylamine (polyEpi/DMA) is available as a commercial product at 50% actives in water (SNF Inc., FL 2749). Poly diallyl dimethyl ammonium chloride (polyDADMAC), another polycation, is available as a dry powder at 100% actives (Floquat TS 45). It can be readily solubilized in water at up to 50% actives, depending on molecular weight (Mw). Both the polyEpi/DMA's and the polyDADMAC's are available in a range of Mw's up to about 1 million, but are less readily solubilized at the higher Mw. Products in the size range about 100 kDa are preferred, because they exhibit good performance and high solubility, although higher Mw materials are also useful.

Other preferred cationic coagulants include ferric and aluminum salts. Polymers of aluminum chlorohydrate, also called polyaluminates or poly aluminum chloride, are particularly effective in saline systems. Commercially available polyaluminates include PAX-18 from Kemira. Polyaluminates are also available from SNF Inc., Riceboro, Ga., as well as other suppliers.

Tannin amines, generally having molecular weights up to about 10,000 Daltons, may also be used. Tannin amines are available from SNF Inc., Riceboro, Ga., as well as other suppliers. The different types of coagulants may also be used in combination.

Molecular weights of the above-recited polycationic coagulants are generally at least 5000, though higher molecular weights, e.g. 20,000, 30,000, 50,000, 75,000, or about 100,000 Daltons, are generally more effective. The molecular weight is generally less than 1 million Daltons, and preferably less than 500 kDa.

The amount of polycationic coagulant used is generally in the range of 1 to 100 ppm, preferably 5 to 50 ppm or 10-20 ppm. Levels of 2.5, 5, and 10 ppm, in combination with similar levels of flocculant (described below) have been effective in the field. Dosing of treatment chemicals, however, is proportional to levels of TOC and total solids in waste streams. Therefore, higher levels of treatment chemicals may be required for treatment of waste streams having higher loadings of TOC and total solids.

Upon addition of coagulant and aging, as described above, cationic coagulant molecules bind to any remaining anionic sites of the emulsified droplets and particulates. This process further neutralizes the anionic character of the reverse emulsion, and also provides for enhanced binding of the flocculant added in the next step.

In selected embodiments, further chemical treatments may be desired, e.g. for treatment of sour fluids (containing $H_2S$) or for treatment of microbes. Such can be added, for example, via line 17 (FIG. 1), which input could also be located elsewhere in the system for optimal effect.

(3) Addition of Flocculant and Microbubbles

A flocculant is added and is able to adhere to the microdroplets and particulates, binding them together into flocs, which then in turn bind to each other to form larger agglomerations. As this occurs, microbubbles that are present during the flocculation and agglomeration processes may not only adhere to the oily solids but also become entrapped in the growing agglomerations, rendering them buoyant.

Thus, a dose of flocculating chemical 18 may be added to pH adjusted and/or coagulant-treated stream 19 just prior to, or simultaneously with, the introduction of the microbubbles. That is, gas from gas unit 20 (typically natural gas/methane) may be introduced to recycle stream 54 (FIG. 2) prior to pump 21, preferably an Edur-type pump, that generates microbubbles into a stream, with the stream joining treatment stream 19 immediately. For example, in one embodiment, a methane bubble of nominal 20-30 µm can be generated via the action of the pump 21. Preferably, the flocculant can be added at the pump inlet, as shown in FIG. 2; alternatively, it can be introduced at the pump outlet. Thereby, the flocculant and microbubbles are added nearly simultaneously to process stream 19, which has already been subjected to the pH, coagulant, and aging treatments.

The flocculant acts to further strengthen the agglomerating oily solids against re-emulsification during subsequent handling steps, while the entrapped microbubbles also render the flocculated oily solids highly floatable. Entrapping the microbubbles, as compared to relying on passive adsorption of microbubbles, as is the case in most current flotation schemes, is a much more effective strategy.

The flocculant is a water-soluble, high molecular weight hydrogen-bonding agent which serves to bridge oily droplets and particulates, flocculate them and bring them quickly out of solution or emulsion. Preferred hydrogen-bonding agents are acrylamide copolymers (commonly termed PAMs). The copolymer may be an anionic acrylamide copolymer, such as an acrylamide/acrylate copolymer or, in a preferred embodiment, a cationic acrylamide copolymer ("cationic PAM"), such as an acrylamide/allyl trialkyl ammonium copolymer. A representative cationic acrylamide copolymer is acrylamide/allyl triethyl ammonium chloride (ATAC) copolymer.

These acrylamide copolymers typically have about 50-95 mole %, preferably 70-90 mole %, and more preferably around 80-90 mole % acrylamide residues. The molecular weight of the flocculant copolymers is preferably about 5 to 30 million, more preferably 12 to 25 million, and most preferably 15 to 22 million Daltons. In each case, the mole % acrylamide is at least about 50%, and the molecular weight is at least 1 million Daltons, preferably at least 4 million Daltons.

Other cationic monomers that can be copolymerized with acrylamide to form a flocculant copolymer include those noted above, i.e. ammonium alkyl (meth)acrylamides, ammonium alkyl (meth)acrylates, diallyl dialkylammonium salts, and allyl trialkyl ammonium salts. As noted above, the mole % acrylamide in these flocculants is at least about 50%, and more preferably 80-90%.

The cationic acrylamide copolymers are generally more heat-stable in these settings than the anionic acrylamide copolymers. At temperatures above about 80° C., use of cationic polyacrylamides produces separated flocs that remain stable for several hours or longer, even at 95° C.

Flocculants that are preferred include copolymers of acrylate and acrylamide (anionic polyacrylamides, PAM's, such as AN 923 SH from SNF Inc.) or copolymers of allyl triethyl ammonium chloride (ATAC) and acrylamide (cationic PAM's such as FO 4490 SH from SNF Inc.). In many produced waters, either anionic or cationic PAM's are effective as flocculants, provided the molecular size is sufficient. However, for treatment of specific types of produced water, certain types of PAM's are preferred.

For example, in SAGD (steam assisted gravity drainage) produced water, PAM's less than approximately 5 million in Mw are noticeably less effective than larger ones, with sizes of 10 million in Mw and higher preferred. The anionic PAM's that are useful as flocculants typically contain 10 to 30% anionic residues, i.e. acrylate residues, with the remainder as acrylamide, which is uncharged but has a polar hydrogen-bonding group ($—NH_2$). The anionic PAM's are available in Mw's well above 10 million. The cationic PAM flocculants typically contain 10 to 30% cationic residues, i.e. the ATAC residues, but may range into higher % ATAC's as well. The cationic PAM flocculants also have high Mw's, but the Mw range is somewhat lower than that of the anionic PAM's, typically at 5 to 8 million Mw. Although this is less than optimal for flocculation activity, the cationic PAM's have the advantage of greater tolerance to high temperatures in aqueous environments.

That is, an anionic PAM will tend to lose activity at 90° C. within about 30 minutes in aqueous solution. In contrast, a cationic PAM will retain its activity as a flocculant for several hours under these same conditions. At temperatures of 80° C. or less, both anionic and cationic PAM's are thermally stable. Hence, for SAGD produced water, which is generally close to 90° C. when first treated and may remain at temperatures above 80° C. throughout the entire process stream, cationic PAM flocculants are often preferred. For produced waters that are at lower temperatures, as in surface mining operations and in waste streams that are taken off-site for disposal, anionic PAM flocculants are often preferred.

Another factor to consider in selecting an anionic versus a cationic PAM as flocculant is the overall charge of the particulates to be agglomerated. That is, emulsified oily solids or soil particulates that contain a significant mineral component, such as clays and sands, have binding sites that overall have higher affinities for anionic binding agents. Consequently, anionic PAM's may be preferred in such an application, although the mineral faces also will bind satisfactorily to cationic PAM's, albeit with somewhat lower affinities. On the other hand, biological process streams, such as animal waste streams and process streams associated with food processing, contain biological particulates that mainly exhibit anionic binding sites on their external surfaces. Consequently, cationic PAM's may be preferred in such applications.

In another embodiment, the acrylamide copolymer can be provided in combination with an activated polysaccharide, such as an activated starch (see e.g. Sikes et al., U.S. Pat. No. 7,595,002). The ratio of these components (activated starch: acrylamide copolymer) is typically in the range of 0.1:1 to 100:1, preferably 0.5:1 to 10:1, more preferably 1:1 to 5:1.

The amount of flocculant composition used is generally in the range of 1 to 100 ppm, e.g. 2.5-50 or 10-30 ppm. Levels of 30 ppm alone, or 2.5, 5, or 10 ppm in combination with similar levels of a polycationic coagulant, were effective in field tests. A level of 40 ppm, in combination with 20 ppm coagulant, has been shown to be effective even in downstream wastewaters having about 60% solids. As noted above, however, dosing of treatment chemicals is proportional to levels of TOC and total solids in waste streams. Therefore, higher levels of treatment chemicals may be required for treatment of waste streams having higher loadings of TOC and total solids.

(4) Separation of Flocculated Materials from Clarified Water

Figure 3:
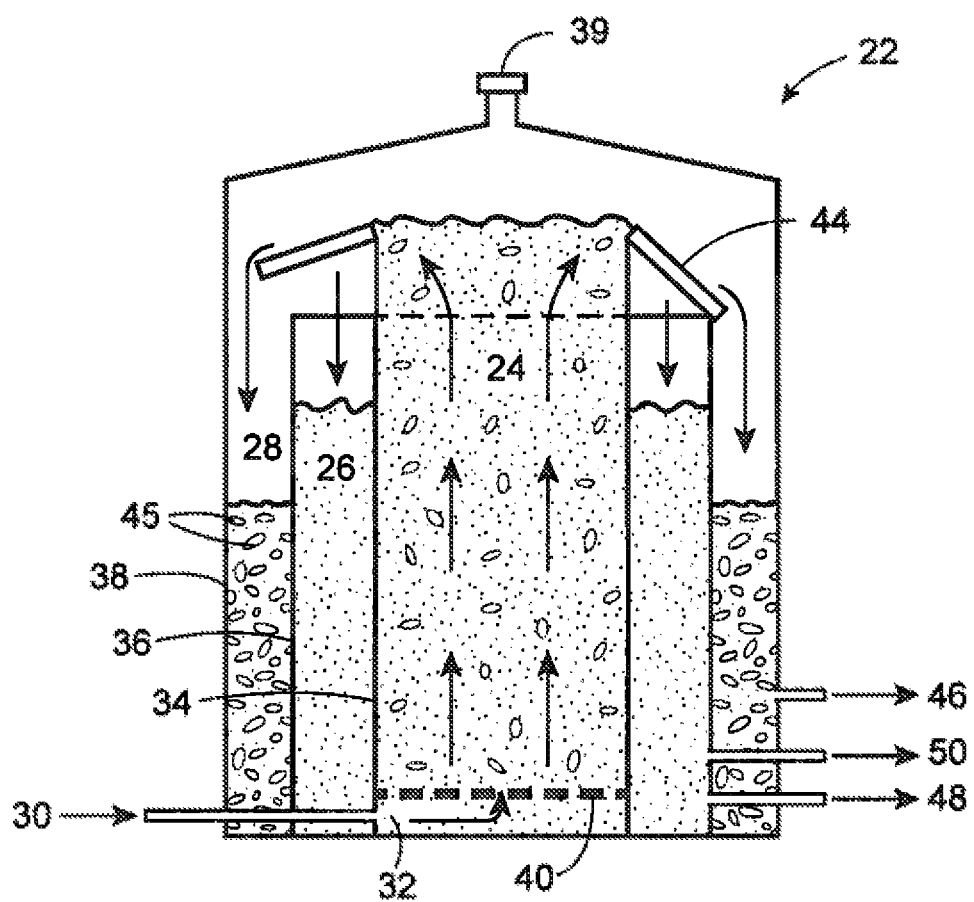
FIG. 3 is a more detailed view of one embodiment of a separation module as disclosed herein.

As shown in FIGS. 2 and 3, the system employs a vertical separation module 22, preferably having a series of nested chambers 24, 26, and 28, for separation of flocs from the treated water. In one embodiment, the separation module comprises a plurality of tanks or shells 34, 36, and 38, configured therein to provide the three chambers 24, 26, and 28 within the module. Thus, as shown in the figures, a perimeter shell 38, which is preferably enclosed and vented (39), can encompass an intermediate shell 36, which itself encompasses an internal shell 34, which defines the inner chamber 24, also termed the riser well. The chambers are typically nested and concentric, as illustrated.

With reference to the Figures, the treated water 30, containing coagulant and flocculant as well as the microbubbles, is introduced into the bottom of riser well (inner chamber) 24 via inlet 32. The riser well 24 preferably includes a flow diffuser 40, situated above the inlet point of the incoming stream. The flow diffuser may be a perforated plate, as shown in FIG. 3 or, alternatively, a shallow inverted cone approximately ¾ the diameter of inner chamber 24, as shown in FIG. 2. The flow diffuser serves to equalize the velocity of water and oily solids rising in the well and provide a uniform stream.

The preferred direction of fluid flow in the riser well 24, exiting from the inlet 32, is thus vertically upward, along with the natural flotation of the agglomerated solids having entrapped microbubbles (produced as a result of simultaneous or near-simultaneous addition of microbubbles and flocculant, as described above).

The treated waters thus flow vertically through the riser well 24, then radially pour over the upper edge of the internal shell 34, and flow along a water-permeable screen or screens 44 which extend(s) beyond the edge of the second tank 36, as shown in greater detail in FIG. 3. The water-permeable screens are porous or perforated to an extent effective to allow for high throughput of the treated water through the screens. Throughputs of up to 1000, 3000, or 6000 gal/min (approx. 3,780, 11,350, or 22,700 L/min) are desirable at large-scale, fixed-site installations. The screens may have various configurations and may, for example, be fabricated of woven wire or solid sheets which have been perforated. In one embodiment, the screens may be stainless-steel, triangular-profiled, welded wire strainers (sometimes referred to as Wedge Wire) or other like strainers known in the art. The total area, open area, specific dimensions, geometry, and materials of construction of the strainer plates (floc screens) may vary with respect to the physical attributes of the water and in particular the oily flocs being separated. The screens may be planar, or they may feature some degree of angularity or curvature.

Preferably, each floc screen 44 is pivotally connected at or near the top of internal shell 34, thereby allowing the angle(s) of the screen(s) to be regulated and periodically adjusted for optimal water and floc separation. As the water and flocs flow over the screen(s), the clarified water flows through the screen(s) 44 into central chamber 26 (also termed the water annulus), defined by inner shell 34 and central shell 36, while a suspension of floc 45 falls over the end of the screen(s) 44 into outer chamber 28 (also termed the launder annulus), defined by central shell 36 and outer shell 38. The suspension of flocs collected in the outer chamber preferably makes up about 5% or less of the bulk flow.

Such passive overflow may advantageously be augmented by use of a skimming device (not shown). In addition, a programmable rinse cycle for clearing the screen(s) may be included, whereby a stream of the clarified fluid is directed over the screen(s) 44 and into the launder chamber 28 for a duration, for example, 2 to 10 seconds, at intervals of 5 minutes, or a variation of this timed-pulse design as may be necessitated by the loadings on the screen(s).

The screened floc collected in chamber 28 is typically in the form of a suspension or slurry having a substantial proportion of the oily flocculated solids 45 floating or buoyant in an underflow of clarified water. In one embodiment, this waste slurry could be processed in a filter press to render the solids more landfill-ready and recover a further clarified stream for downstream processing. Alternatively, a decanter centrifuge could be used to process and further separate the waste slurry.

In one embodiment, the tanks/shells are substantially cylindrical and the chambers substantially cylindrical or annular. However, other configurations could also be used; the tanks/shells may be cylindrical, elliptical, square or other polygonal, or combinations thereof. The screens 44 may also vary in shape, and they may be effective to cover all or a portion of the top of chamber 26. For example, in one embodiment, two screens 44 may be used, extending from opposite sides of the upper perimeter of central shell 34. Alternatively, three, four or more screens could be used, distributed symmetrically or non-symmetrically around the upper perimeter of central shell 34. In further embodiments, a substantially contiguous screen or series of screens, effective to cover either a portion or substantially all of the top of chamber 26, could be used.

In any case, the flow of treated water from riser well 24 is directed such that it cannot enter chamber 26 without passing over and through screen(s) 44. In preferred embodiments, for example, any portions of the upper edge of central shell 34 to which screens are not attached extend slightly above the upper level(s) of the screen(s), to direct the flow of water to the screens and prevent passage of water around the screens.

While the angle of attachment of screens around the perimeter is typically equal, different angles may also be employed (as shown, for example, in FIG. 3). Angles typically are in the range of about 30° to about 45° from the horizontal (such that a 90° angle would be parallel to the shell wall), though larger or smaller angles may also be used.

Effluent ports are provided, as shown in FIGS. 2 and 3. Typically, at least one effluent port 46 is provided for outer chamber 28, for flocculated material, and at least two effluent ports are provided for chamber 26, one for the bulk of the clarified water (48) and one for recycle/rinse water (50), which also makes up the receiving stream 54 for the microbubbles.

Preferably, the perimeter shell 38 has a diameter of 8 feet (approx. 2.4 m) or less, thus avoiding the requirement of a wide-load designation for transporting the module, as per highway traffic legislation. The internal shells 34 and 36 may have varying geometries, as noted above, such as cylindrical, square or other polygonal, or combinations thereof.

In another embodiment, providing a moderately sized installation for assembly on site, the vertical separation tank comprises a riser well 24, a water chamber 26, and, in place of external chamber 28, a plurality of collection tanks located around the perimeter of shell 36, their placement corresponding to that of the floc screen(s) 44, such that flocs flow over the screen(s) into the tanks. In this case, shell 36 is preferably up to 8 feet (approx. 2.4 m) in diameter, for transportation purposes. The collection tanks may be transported separately and assembled on site. Likewise, the system enclosure with ventilation may be assembled on site. Riser well 24, chamber 26, and the collection tanks may have varying geometries as described above, e.g. cylindrical, square or other polygonal, or combinations thereof.

This waste stream of oily floc 45 (FIG. 3) which flows into outer launder chamber 28 (or collection tanks, in an alternative embodiment) preferably makes up less than 5% of the bulk flow, and is periodically or continually pumped away (53) for subsequent processing (55) (FIG. 2). The majority of the clarified water, which flows through the screens and into the water annulus 26, preferably makes up more than 95% of the bulk flow, including the microbubble stream and/or the rinse cycle flow, if implemented.

In some embodiments, particularly for deep well injection, bag filters, e.g. a 100μ filter followed by a 20μ filter, may be placed in the effluent line of clarified water that feeds the disposal well. These filters may be used to entrap any residual solid particulates that fall through the floc screen(s) 44 into the containment volume 26.

Prior to the separated water 52 being sent for additional processing, the pH can be raised to a pH of 7 or 8 if desired by the addition of a caustic such as sodium hydroxide (NaOH). After the water is neutralized, it can be sent for additional chemical processing and later reused in thermal oil recovery processes.

A portion of the separated water, e.g. about 20 gal/min (about 76 L/min) or more, is typically recycled (54), as noted above, to facilitate introduction of microbubbles (FIG. 2). Because this is a recycle volume, it does not affect the overall throughput of the system once the flotation mechanism is operating.

The illustrated and described arrangements of the riser well (inner chamber) 24, water collection annulus (central chamber) 26, strainer assemblies 44, and floc launder annulus (outer chamber(s)) 28 as described are not intended to limit the scope of the invention; various other configurations are possible.

It has been found that, when the above described chemical treatment sequence is carried out, the flocs that form are sufficiently stable to be cleanly separated in the herein disclosed screening module. The buoyancy and stability of the flocs allows for high throughput of the treated water. Throughputs of up to 1000, 3000, or 6000 gal/min (approx. 3,780, 11,350, or 22,700 L/min) are desirable at large-scale, fixed-site installations. A typical throughput of produced water that accompanies production of 30,000 barrels per day of bitumen at a SAGD oil recovery operation, for example, is about 2500 gal/min (approx. 9500 L/min).

Use of the herein described chemical treatment process and screening module can greatly reduce residual contamination in treated produced waters. For example, in current operation, using prior art treatment protocols, when process waters are sent through bag filters as described above, the amount of residue in the treated waters necessitates changing of the bag filters as frequently as every 20 minutes. This results in a large amount of costly downtime and operator time built into the process. When the treatment process of the present invention was implemented at a disposal well site, the inventors noted that the frequency of bag filter changes in the system was reduced to once per shift or less.

As indicated above, the proposed process and apparatus are useful for treatment of oily produced waters intended for injection into a deep well for disposal, such that the oil and organic content of the stream set for disposal can be effectively minimized. This reduces the risk of damage and contamination to the process equipment, to the well, and to the disposal formation itself. In addition, the costs and therefore loss of revenues that are associated with downtime and rejuvenating a well along with the receiving formation are minimized.

The process and apparatus of the invention are also intended for clarification and deoiling of produced waters for recycling and reuse, as well as for disposal, in oil sands mining, including both surface mining and SAGD operations.

Further, the proposed process and apparatus are useful for treatment of oily produced waters intended for re-injection into producing formations for pressure maintenance (water flooding, polymer flooding), such that the oil and organic content can be effectively minimized so as to reduce the risk of damage to the flooded formation and/or reduce the operating cost associated with pumping oily water into such a formation.

The invention claimed is:

1. A method of clarifying waste process water containing soluble organic compounds, suspended and/or emulsified oils and/or solids, the method comprising:
    (a) adding a polycationic coagulant to the waste process water;
    (b) following step (a), subjecting the waste process water to an aging step for 5 seconds to 10 minutes in length in which the waste process water undergoes reduced turbulence;
    (c) following said aging step and addition of coagulant, adding a flocculant, comprising an acrylamide copolymer having a molecular weight of at least 4 million Daltons, to the waste process water, and simultaneously introducing gaseous microbubbles into the waste process water, whereby, during subsequent formation and agglomeration of flocs of solid and semisolid matter, the gaseous microbubbles become entrained within and adhere to the flocs;
    (d) introducing the flocculant-treated waste process water and flocs into a separation module, the separation module comprising three containment systems, designated (i) an inner tank, having an inlet and defining an inner chamber, (ii) a central tank, having at least one outlet, surrounding said inner tank and defining an annular central chamber, and (iii) one or more outer tanks exterior to said central tank, each having at least one outlet, and defining an outer chamber or chambers,
        wherein the upper perimeter of the inner tank has attached thereto one or more porous screens which extend over the central chamber at a downward angle, to reach the outer chamber or chambers, and cover at least a portion of the annular central chamber,
        such that said flocculant-treated waste process water flows through said inlet, upward through said inner chamber, over and though said one or more porous screens, and into the annular central chamber, and said flocs flow over said one or more porous screens and into said outer chamber or chambers.

2. The method of claim 1, wherein, prior to, concomitant with or immediately following step (a), the pH of the waste process water is adjusted to about 2.0 to 4.0.

3. The method of claim 2, comprising two aging steps, one following the pH adjustment and another following the addition of polycationic coagulant.

4. The method of claim 3, wherein each said aging step is 5 seconds to 5 minutes in length.

5. The method of claim 3, wherein each said aging step is 15 to 60 seconds in length.

6. The method of claim 1, wherein said one or more porous screens are perforated to allow for throughput of the flocculant-treated waste process water and said reduced turbulence is facilitated by the use of an increased diameter pipe for throughput during said aging step.

7. The method of claim 6, wherein said increased diameter pipe is 8 or more inches in diameter.

8. The method of claim 6, wherein said increased diameter pipe is 12 or more inches in diameter.

9. The method of claim 6, wherein the length of said increased diameter pipe is 10 meters or more.

10. The method of claim 6, wherein the length of said increased diameter pipe is 20 meters or more.

11. The method of claim 1, wherein the waste process water has a flow rate of 300 gallons/minute or less during said aging step.

12. The method of claim 1, wherein said outer chamber or chambers is a single chamber surrounding the annular central chamber, such that flocs flowing over said one or more porous screens flow into said single chamber.

13. The method of claim 1, wherein said separation module comprises a plurality of outer tanks surrounding said central tank, at locations corresponding to said one or more porous screens, such that flocs flowing over said one or more porous screens flow into said outer tanks.

14. The method of claim 1, wherein any portions of the upper perimeter of the inner tank to which screens are not attached are of increased height, to direct flow of flocculant-treated waste process water out of the inner tank to the screens.

15. The method of claim 1, wherein screens are attached to the entire perimeter of the upper edge of the inner tank.

16. The method of claim 1, wherein the waste process water is injected into a disposal well after treatment.

17. The method of claim 1, wherein the waste process water is downstream waste water (produced water) from an oil sands mining operation, comprising a hydrocarbon- and bitumen-containing oil-in-water emulsion with suspended microparticulate mineral materials.

18. The method of claim 17, wherein the oil sands mining operation is a steam-assisted, gravity drainage (SAGD) operation.

19. The method of claim 1, wherein the polycationic coagulant is an epichlorohydrin-dimethylamine copolymer (polyEPI/DMA) or a polymer of diallyl dimethyl ammonium chloride (polyDADMAC) and has a molecular weight less than 1 million Daltons.

20. The method of claim 1, wherein the polycationic coagulant is a polyaluminate.

21. The method of claim 1, wherein the acrylamide copolymer is selected from an acrylamide/acrylate copolymer, an acrylamide/allyl trialkyl ammonium copolymer, and an acrylamide/diallyl dialkyl ammonium copolymer.

22. The method of claim 1, wherein the flocculant further comprises a heat-activated or pregelatinized starch having flocculating activity.

23. A separation module for separation of flocculated materials from water, comprising three containment systems, designated (i) an inner tank, having an inlet and defining an inner chamber, (ii) a central tank, having at least one outlet, surrounding said inner tank and defining an annular central chamber, and (iii) one or more outer tanks exterior to said central tank, each having at least one outlet, and defining an outer chamber or chambers,
    wherein the upper perimeter of the inner tank has attached thereto one or more porous screens which extend over the central chamber at a downward angle, to reach the outer chamber or chambers, and cover at least a portion of the annular central chamber, such that water containing flocculated material introduced into said inlet is able to flow upward through said inner chamber, over and though said one or more porous screens, and into the annular central chamber as clarified water, while said flocculated material flows over said one or more porous screens and into said outer chamber or chambers.

24. The module of claim 23, wherein said outer chamber or chambers is a single chamber surrounding the annular central chamber, such that material flowing over said one or more porous screens flows into said single chamber.

25. The module of claim 23, comprising a plurality of outer tanks surrounding said central tank, at locations corresponding to said one or more porous screens, such that material flowing over said one or more porous screens flows into said outer tanks.

26. The module of claim 23, wherein any portions of the upper perimeter of the inner tank to which screens are not attached are of increased height, to direct flow of water out of the inner tank to the screens.

27. The module of claim 23, wherein screens are attached to the entire perimeter of the upper edge of the inner tank.

\* \* \* \* \*